(12) United States Patent
Matsumoto et al.

(10) Patent No.: US 10,816,472 B2
(45) Date of Patent: Oct. 27, 2020

(54) IMAGE ACQUISITION DEVICE AND IMAGE ACQUISITION METHOD

(71) Applicant: HAMAMATSU PHOTONICS K.K., Hamamatsu-shi, Shizuoka (JP)

(72) Inventors: Naoya Matsumoto, Hamamatsu (JP); Koyo Watanabe, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 244 days.

(21) Appl. No.: 15/544,405

(22) PCT Filed: Jan. 12, 2016

(86) PCT No.: PCT/JP2016/050665
§ 371 (c)(1),
(2) Date: Jul. 18, 2017

(87) PCT Pub. No.: WO2016/117408
PCT Pub. Date: Jul. 28, 2016

(65) Prior Publication Data
US 2017/0370844 A1    Dec. 28, 2017

(30) Foreign Application Priority Data

Jan. 20, 2015  (JP) .................................. 2015-008444

(51) Int. Cl.
*G01N 21/64* (2006.01)
*G02B 21/06* (2006.01)
(Continued)

(52) U.S. Cl.
CPC ......... *G01N 21/6456* (2013.01); *G01N 21/64* (2013.01); *G02B 21/002* (2013.01);
(Continued)

(58) Field of Classification Search
CPC .. G01N 21/6456; G01N 21/64; G02B 21/002; G02B 21/0032; G02B 21/0036;
(Continued)

(56) References Cited

U.S. PATENT DOCUMENTS 5,982,553 A   11/1999   Bloom et al.
6,028,306 A    2/2000   Hayashi
(Continued)

FOREIGN PATENT DOCUMENTS

CN   100559165 C   11/2009
CN   102162908 A    8/2011
(Continued)

OTHER PUBLICATIONS

Volodymyr Nikolenko, et al., "SLM, microscopy scanless two-photon imaging and photostimulation using spatial light modulators", Frontiers in Neural Circuits, vol. 2, Jan. 31, 2008, XP055146495.
(Continued)

*Primary Examiner* — Georgia Y Epps
*Assistant Examiner* — Don J Williams
(74) *Attorney, Agent, or Firm* — Faegre Drinker Biddle & Reath LLP

(57) ABSTRACT

An image acquisition device includes a spatial light modulator modulating irradiation light, a control unit controlling a modulating pattern so that first and second light converging points are formed in an observation object, a light converging optical system converging the irradiation light, a scanning unit scanning positions of the first and second light converging points in the observation object in a scanning direction intersecting an optical axis of the light converging optical system, and a photodetector detecting first observation light generated from the first light converging point and second observation light generated from the second light converging point. The photodetector has a first detection
(Continued)

area for detecting the first observation light and a second detection area for detecting the second observation light. The positions of the first and second light converging points are different from each other in a direction of the optical axis.

22 Claims, 14 Drawing Sheets

(51) Int. Cl.
    *G02B 21/36*     (2006.01)
    *G02B 21/16*     (2006.01)
    *G02B 21/00*     (2006.01)
    *G02F 1/133*     (2006.01)
    *G02F 1/1337*     (2006.01)
    G02B 26/08     (2006.01)
    G02B 27/00     (2006.01)
    G02B 21/08     (2006.01)

(52) U.S. Cl.
    CPC ............ *G02B 21/06* (2013.01); *G02B 21/16* (2013.01); *G02B 21/365* (2013.01); *G02F 1/13318* (2013.01); *G02F 1/133788* (2013.01); G02B 21/08 (2013.01); G02B 26/0808 (2013.01); G02B 27/0031 (2013.01)

(58) Field of Classification Search
    CPC .... G02B 21/0076; G02B 21/06; G02B 26/10; G02B 27/0031; G02F 1/01; G02F 1/13318; G02F 1/133788
    See application file for complete search history.

(56) References Cited

U.S. PATENT DOCUMENTS

| | | | |
|---|---|---|---|
| 6,758,402 | B1 | 7/2004 | Check et al. |
| 7,098,871 | B1 | 8/2006 | Tegreene et al. |
| 7,709,773 | B2 | 5/2010 | Yamashita et al. |
| 8,526,091 | B2 | 9/2013 | Ito et al. |
| 9,188,874 | B1 | 11/2015 | Johnson |
| 2003/0021016 | A1 | 1/2003 | Grier |
| 2007/0057211 | A1 | 3/2007 | Bahlman et al. |
| 2007/0262264 | A1 | 11/2007 | Hasegawa et al. |
| 2008/0297730 | A1* | 12/2008 | Park ...................... G02B 5/285 353/31 |
| 2009/0147330 | A1 | 6/2009 | Seo et al. |
| 2010/0014088 | A1 | 1/2010 | Wiki |
| 2011/0134516 | A1* | 6/2011 | Araya ................ G02B 21/0004 359/371 |
| 2011/0137126 | A1 | 6/2011 | French et al. |
| 2011/0267663 | A1 | 11/2011 | Murayama |
| 2011/0273757 | A1 | 11/2011 | Kobayashi |
| 2012/0327501 | A1 | 12/2012 | Sakamoto et al. |
| 2012/0329247 | A1 | 12/2012 | Sakamoto |
| 2014/0146159 | A1 | 5/2014 | Liu et al. |
| 2015/0323787 | A1 | 11/2015 | Yuste et al. |
| 2016/0018786 | A1 | 1/2016 | Matsumoto |
| 2016/0124221 | A1* | 5/2016 | Huang ................ G01M 11/0264 359/239 |
| 2016/0178880 | A1 | 6/2016 | Yamazaki |
| 2017/0205613 | A1 | 7/2017 | Fukuyama |

FOREIGN PATENT DOCUMENTS

| | | |
|---|---|---|
| CN | 103226238 A | 7/2013 |
| CN | 103403610 A | 11/2013 |
| EP | 1889111 | 2/2008 |
| EP | 2 703 871 | 3/2014 |
| JP | H06-94641 A | 4/1994 |
| JP | H10-311950 A | 11/1998 |
| JP | 2004-138906 A | 5/2004 |
| JP | 2006-071611 A | 3/2006 |
| JP | 2009-175441 A | 8/2009 |
| JP | 2011-128572 A | 6/2011 |
| JP | 2011-527218 A | 10/2011 |
| JP | 2012-226268 A | 11/2012 |
| JP | 2013-225118 A | 10/2013 |
| JP | 2014-006308 A | 1/2014 |
| WO | WO 2006/127967 A2 | 11/2006 |
| WO | WO-2010/004297 A1 | 1/2010 |
| WO | WO 2014/117079 | 7/2014 |
| WO | WO-2014/136784 A1 | 9/2014 |

OTHER PUBLICATIONS

Li Ge, et al., "Enumeration of illumination and scanning modes from real-time spatial light modulators", Optics Express, vol. 7, No. 12, Dec. 4, 2000, p. 403, XP055496180.

W. Qin et al., "Addressable discrete-line-scanning multiphoton microscopy based on a spatial light modulator", Optics Letters, Mar. 1, 2012, vol. 37, No. 5, p. 827-p. 829.

International Preliminary Report on Patentability dated Aug. 3, 2017 for PCT/JP2016/050665.

English-language translation of International Preliminary Report on Patentability (IPRP) dated Aug. 3, 2017 that issued in WO Patent Application No. PCT/JP2016/050700.

Yonghong, Shao, et al, "Addressable multiregional and multifocal multiphoton microscopy based on a spatial light modulator", Journal of Biomedical Optics, Apr. 3, 2012, p. 030505-I-p. 030505-3, XP055495857.

Junle, Qu, et al., "Recent Progress in Multifocal Multiphoton Microscopy", Journal of Innovative Optical Health Sciences: Jiohs, vol. 5, No. 3, Aug. 4, 2012.

Young, P.A., et al., "The effects of spherical aberration on multiphoton fluorescence excitation microscopy: Effects of Spherical Aberration on MPM", Journal of Microscopy, Oct. 11, 2010.

Bewersdorf, Jorg, et al., "Multifocal Multi-Photon Microscopy In: Handbook of Biological Confocal Microscopy", Springer Science+Business Media, Jan. 31, 2006, p. 550-p. 560, XP055039836.

U.S. Office Action dated Feb. 8, 2019 that issued in U.S. Appl. No. 15/544,429.

Leveque-Fort et al., "Fluorescence-lifetime imaging with a multifocal two-photon microscope", Optics Letters, Optical Society of America, US, vol. 29, No. 24, Dec. 15, 2004, p. 2884-p. 2886, XP002390049.

Matsumoto et al., "An adaptive approach for uniform scanning in multifocal multiphoton microscopy with a spatial light modulator", Optics Express, vol. 22, No. 1, Jan. 13, 2014, p. 633-p. 645, XP055330571.

Kim et al., "High speed handheld multiphoton multifoci microscopy", Proceedings of SPIE/IS & T, vol. 5323, Jan. 1, 2004, p. 267-p. 272, XP002403959.

* cited by examiner (a)

(b)

(a)

(b)

IMAGE ACQUISITION DEVICE AND IMAGE ACQUISITION METHOD

TECHNICAL FIELD

An aspect of the present invention relates to an image acquisition device and an image acquisition method.

BACKGROUND ART

Non-Patent Literature 1 discloses a multiphoton absorption microscope using a spatial light modulator (SLM). This microscope is intended to acquire a fluorescence image from within an observation object at high speed and clearly by forming and scanning a plurality of excitation light spots using the SLM.

CITATION LIST

Patent Literature

[Patent Literature 1] Japanese Unexamined Patent Publication No. 2012-226268

Non Patent Literature

[Non-Patent Literature 1] Wan Qin, Yonghong Shao, Honghai Liu, Xiang Peng, Hanben Niu, and Bruce Gao, "Addressable discrete-line-scanning multiphoton microscopy based on spatial light modulator", OPTICS LETTERS, Vol. 37, No. 5, pp. 827-829, Mar. 1, 2012

SUMMARY OF INVENTION

Technical Problem

In recent years, technology for modulating light such as excitation light and illumination light radiated to an observation object using an SLM have been studied. According to such technology, it is possible to realize various types of irradiation light, for example, light having a flat intensity distribution, light to be simultaneously radiated to a plurality of positions (spots) with respect to the observation object, and the like.

In this technology, a case in which a plurality of spot lights having different light converging positions are radiated within a plane perpendicular to an optical axis direction of the irradiation light when light is simultaneously radiated to a plurality of positions has been disclosed (see, for example, Non-Patent Literature 1), but technology for simultaneously radiating a plurality of spot lights having different light converging positions in a direction parallel to the optical axis direction, i.e., in a depth direction of the observation object, has not been disclosed. Because it is possible to simultaneously observe a plurality of portions having different depths if light converging positions can be made different in the depth direction, there is a significant advantage in that it is possible to shorten an observation time in a case in which the observation object is thick or the like and acquire states of a plurality of portions having different depths at the same time.

An objective of an aspect of the present invention is to provide an image acquisition device and an image acquisition method capable of simultaneously radiating a plurality of lights having different light converging positions in a depth direction of an observation object.

Solution to Problem

An image acquisition device according to an embodiment of the present invention is a device for acquiring an image of an observation object, the device including: a spatial light modulator modulating irradiation light output from a light source; a control unit controlling a modulating pattern to be presented on the spatial light modulator so that a first light converging point and a second light converging point are formed in an observation object; a light converging optical system converging the modulated irradiation light for forming the first light converging point and the second light converging point in the observation object; a scanning unit scanning positions of the first light converging point and the second light converging point in the observation object in a scanning direction intersecting an optical axis of the light converging optical system; a photodetector detecting first observation light generated from the first light converging point and second observation light generated from the second light converging point; and an image creating unit creating an image of the observation object using a detection signal from the photodetector. The photodetector has a first detection area for detecting the first observation light and a second detection area for detecting the second observation light. The positions of the first and second light converging points are different from each other in a direction of the optical axis of the light converging optical system.

Also, an image acquisition device according to another embodiment of the present invention is a device for acquiring an image of an observation object, the device including: a spatial light modulator modulating irradiation light output from a light source; a control unit controlling a modulating pattern to be presented on the spatial light modulator so that a first light converging point and a second light converging point are formed in an observation object; a light converging optical system converging the modulated irradiation light for forming the first light converging point and the second light converging point are formed in the observation object; a photodetector detecting first observation light generated from the first light converging point and second observation light generated from the second light converging point; and an image creating unit creating an image of the observation object using a detection signal from the photodetector. The modulating pattern includes a pattern for scanning the first light converging point and the second light converging point in a scanning direction intersecting an optical axis of the light converging optical system. The photodetector has a first detection area for detecting the first observation light and a second detection area for detecting the second observation light. The positions of the first and second light converging points are different from each other in a direction of the optical axis.

Also, an image acquisition method according to an embodiment of the present invention is a method of acquiring an image of an observation object, the method including the steps of: presenting a modulating pattern for forming a first light converging point and a second light converging point in an observation object on a spatial light modulator; modulating irradiation light output from a light source in the spatial light modulator and converging the modulated irradiation light by a light converging optical system for forming the first light converging point and the second light converging point in the observation object; detecting first observation light generated from the first light converging point and second observation light generated from the second light converging point while scanning position of the first light converging point and the second light converging point in the observation object in a scanning direction intersecting an optical axis of the light converging optical system; and creating an image of the observation object using a detection signal obtained in the light detecting step. The photodetector having a first detection area for detecting the first observation light and a second detection area for detecting the second observation light is used in the light detecting step. The positions of the first and second light converging points are different from each other in a direction of the optical axis of the light converging optical system.

In the image acquisition device and the image acquisition method, it is possible to simultaneously and easily form the first and second light converging points having different light converging positions in the direction of the optical axis (i.e., a depth direction of the observation object) by presenting the modulating pattern on the spatial light modulator. Then, the first and second light converging points are scanned and the first observation light and the second observation light generated at the light converging points are detected by the photodetector. Because the photodetector has the first detection area for detecting the first observation light and the second detection area for detecting the second observation light, it is possible to simultaneously detect the first observation light and the second observation light for which light emission positions are different from each other. In this manner, according to the above-described image acquisition device and image acquisition method, it is possible to simultaneously radiate a plurality of lights having different light converging positions in a depth direction of an observation object and further simultaneously detect a plurality of observation lights having different light emission positions in a depth direction. Accordingly, it is possible to shorten an observation time in a case in which the observation object is thick or the like and easily acquire states of a plurality of portions having different depths at the same time.

In the above-described image acquisition device and image acquisition method, the first and second light converging points may be arranged in the scanning direction when viewed from the direction of the optical axis. Thereby, for example, it is possible to simultaneously ascertain influences occurring at depths different from a light converging point according to the light converging point located at a front side in a scanning direction by detecting observation light generated from a light converging point located at a rear side in the scanning direction.

Alternatively, in the above-described image acquisition device and image acquisition method, the first and second light converging points may be arranged in a first direction intersecting the scanning direction when viewed from the direction of the optical axis. In this case, the first direction may be perpendicular to the scanning direction or may be inclined with respect to the scanning direction. Thereby, for example, it is possible to simultaneously observe phenomena occurring due to different depths of different positions within a plane orthogonal to the optical axis direction.

In the above-described image acquisition device, the scanning unit may include a light scanner receiving the modulated irradiation light or include a stage moving the observation object in the scanning direction while holding the observation object. Likewise, in the light detecting step of the above-described image acquisition method, scanning of the first and second light converging points may be performed using a light scanner receiving the modulated irradiation light, scanning of the first and second light converging points may be performed using a stage moving the observation object in the scanning direction while holding the observation object, or a pattern for scanning the first and second light converging points may be superimposed on the modulating pattern. Through any one thereof, it is possible to scan the positions of the first and second light converging points.

In the above-described image acquisition device and image acquisition method, the photodetector may include a multi-anode photomultiplier tube having a plurality of anodes or include an area image sensor having a plurality of pixels. Through any one thereof, it is possible to accurately detect the first and second observation light.

Advantageous Effects of Invention

According to an image acquisition device and an image acquisition method according to aspects of the present invention, it is possible to simultaneously radiate a plurality of lights having different light converging positions in a depth direction of an observation object.

DESCRIPTION OF EMBODIMENTS

Hereinafter, embodiments of an image acquisition device and an image acquisition method according to aspects of the present invention will be described in detail with reference to the accompanying drawings. The same elements are denoted by the same reference signs in the description of the drawings, and redundant description thereof will be omitted.

Figure 1:
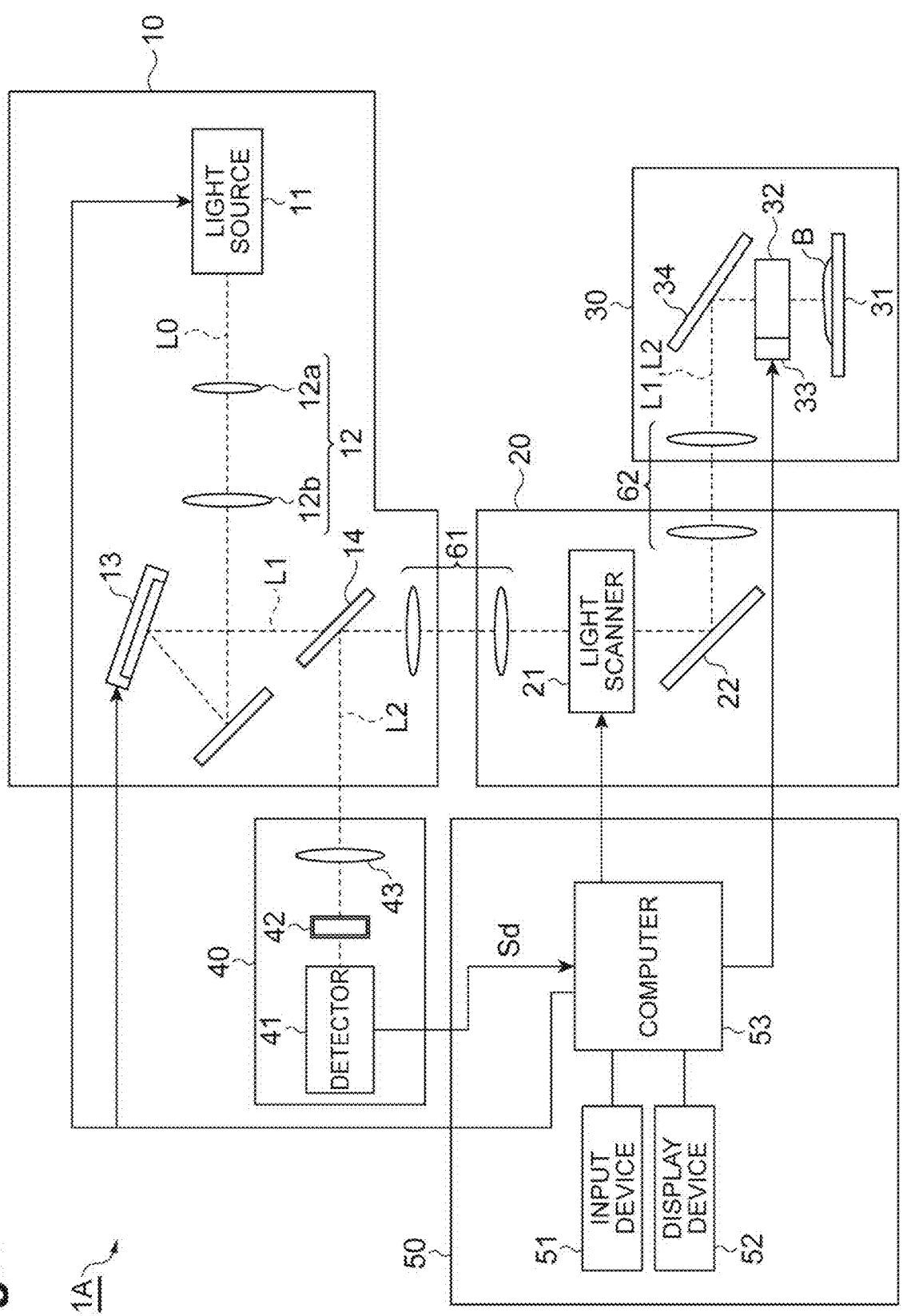
FIG. 1 is a diagram illustrating a configuration of an image acquisition device according to an embodiment of the present invention.

FIG. 1 is a diagram illustrating a configuration of an image acquisition device 1A according to an embodiment of the present invention. The image acquisition device 1A is a device for radiating irradiation light L1 to an observation object B and observing observation light (detected light) L2 generated in the observation object B by the irradiation light L1. The image acquisition device 1A is, for example, a microscope device. As the microscope device, for example, an upright microscope or an inverted microscope can be included. The observation light L2 is, for example, fluorescence, phosphorescence, high-frequency generated light (SHG), reflected light, transmitted light, scattered light, or the like. As illustrated in FIG. 1, the image acquisition device 1A includes an irradiation light generating unit 10, a scanning unit 20, a irradiation optical unit 30, an observation unit 40, and a control unit 50.

The irradiation light generating unit 10 generates the irradiation light L1 to be radiated to the observation object B. The irradiation light generating unit 10 of the present embodiment includes a light source 11, a beam expander 12, and a spatial light modulator (SLM) 13.

The light source 1 outputs irradiation light L0. The irradiation light L0 includes, for example, light having a wavelength to be radiated to the observation object B. The light source 11 is configured to include, for example, a laser light source which oscillates pulsed light or continuous wave, an SLD light source, an LED light source, or the like. The beam expander 12 includes, for example, a plurality of lenses 12a and 12b arranged side by side on the optical axis of the irradiation light L0, and adjusts the size of a cross section perpendicular to the optical axis of the irradiation light L0. Also, the lenses 12a and 12b may be convex lenses, concave lenses, or combinations thereof.

The spatial light modulator 13 is optically coupled to the light source 11 and modulates the irradiation light L0 from the light source 11, thereby generating the irradiation light L1 to be radiated to the observation object B. The spatial light modulator 13 has a plurality of pixels arranged two-dimensionally, and modulates an intensity or phase of the irradiation light L0 output from the light source 11 for each of a plurality of pixel columns. The modulating pattern (hologram) to be presented on the spatial light modulator 13 is controlled by the control unit 50 to be described below. The spatial light modulator 13 may be of a phase modulation type or an amplitude (intensity) modulation type. Also, the spatial light modulator 13 may be either a reflection type or a transmission type. Also, a plurality of spatial light modulators 13 may be provided. In this case, the irradiation light L0 is modulated a plurality of times.

The scanning unit 20 is an example of a scanning unit in the present embodiment. The scanning unit 20 has a light scanner 21 as a scanning optical system. The light scanner 21 is optically coupled to the spatial light modulator 13, and receives the irradiation light L1 modulated by the spatial light modulator 13. Also, the light scanner 21 scans an irradiation position of the irradiation light L1 on the observation object B. Further, the light scanner 21 receives the observation light L2 generated at the light converging point of the observation object B. Thereby, the observation light L2 is de-scanned. The light scanner 21 is controlled by the control unit 50 to be described below. The light scanner 21 includes, for example, a galvanometer mirror, a resonance mirror, an MEMS mirror, a two-dimensional acousto-optic element (AOM), a polygon mirror, or the like. When the light scanner 21 is a biaxial scanner, the light scanner 21 may include an image transferring optical system such as a telecentric optical system.

In addition to the light scanner 21, the scanning unit 20 may further include a mirror 22. The mirror 22 bends an optical axis of the irradiation light L1 to optically couple the light scanner 21 and the irradiation optical unit 30.

The irradiation optical unit 30 irradiates the observation object B with the irradiation light L1 provided from the scanning unit 20 and outputs the observation light L2 from the observation object B to the observation unit 40. The irradiation optical unit 30 includes a stage 31, an objective lens 32, an objective lens moving mechanism 33, and a reflection mirror 34. A dichroic mirror may be used as the reflection mirror 34.

The stage 31 is a member for supporting the observation object B (or a container such as a glass slide, a Petri dish, a microplate, a glass bottomed dish, or the like that contains the observation object B). The stage 31 is made of, for example, glass. In the example illustrated in FIG. 1, the irradiation light L1 is radiated from a front side of the stage 31, but the irradiation light L1 may be radiated from a back side of the stage 31 to the observation object B through the stage 31. The stage 31 can move in a plane direction intersecting (for example, orthogonal to) the optical axis of the objective lens 32 to be described below. Also, the stage 31 may be movable in the optical axis direction of the objective lens 32.

The objective lens 32 is arranged to face the observation object B and is a light converging optical system that forms a light converging point of the irradiation light L1 inside the observation object B. Also, the objective lens 32 receives the observation light L2 generated at the light converging point of the observation object B and collimates the observation light L2. An objective lens for the irradiation light L1 and an objective lens for the observation light L2 may be provided separately. For example, an objective lens having a high numerical aperture (NA) may be used for the irradiation light L1, and the objective lens may locally converge light through aberration correction by the spatial light modulator 13. In this case, the amount of aberration on the surface and/or the inside of the observation object B may be actually measured or obtained, or may be estimated and obtained by simulation or the like. Also, more light can be extracted using an objective lens with a large pupil for the observation light L2. The objective lens for the irradiation light L1 and the objective lens for the observation light L2 are arranged to sandwich the observation object B and the transmitted light on the observation object B of the irradiation light L1 may be acquired as the observation light L2.

The objective lens moving mechanism 33 is a mechanism for moving the objective lens 32 in the optical axis direction of the irradiation light L1. The objective lens moving mechanism 33 includes, for example, a stepping motor or a piezoelectric actuator.

The reflection mirror 34 reflects the irradiation light L1 reaching the irradiation optical unit 30 from the irradiation light generating unit 10 toward the objective lens 32. Also, the reflection mirror 34 reflects the observation light L2 from the observation object B toward the scanning unit 20.

When a distance between the objective lens 32 and the spatial light modulator 13 is long, at least one telecentric optical system may be provided on the optical axis of the irradiation light L1 and the observation light L2. As an example, FIG. 1 illustrates two telecentric optical systems 61 and 62. The telecentric optical systems 61 and 62 serve to transfer the wavefront of the irradiation light L1 generated in the spatial light modulator 13 to a rear focal point of the objective lens 32. The telecentric optical systems 61 and 62 may be double-sided telecentric optical systems. In this case, the telecentric optical system 61 arranged between the spatial light modulator 13 and the light scanner 21 is adjusted to form an image on a modulation surface of the spatial light modulator 13 and a scanning surface of the light scanner 21. The telecentric optical system 62 arranged between the light scanner 21 and the objective lens 32 is adjusted to form an image on the scanning surface of the light scanner 21 and the pupil surface of the objective lens 32. Also, if the wavefront of the irradiation light L1 generated by the spatial light modulator 13 can be transferred to the rear focal point of the objective lens 32, the telecentric optical systems 61 and 62 may be an image-side telecentric optical system or an object-side telecentric optical system. Also, when the distance between the objective lens 32 and the spatial light modulator 13 is extremely small, it is also possible to omit the telecentric optical system.

The observation unit 40 has a photodetector 41, a filter 42, and a converging lens 43. The photodetector 41 is optically coupled to the objective lens 32 and the light scanner 21 and receives the observation light L2 to detect a light intensity of the observation light L2. The photodetector 41 is optically coupled to the light scanner 21 via a dichroic mirror 14 provided in the irradiation light generating unit 10. The dichroic mirror 14 is arranged at a position at which the irradiation light L1 modulated by the spatial light modulator 13 and the observation light L2 de-scanned by the light scanner 21 are received, transmits at least a part of the irradiation light L1, and reflects at least a part of the observation light L2. The photodetector 41 detects the light intensity of the observation light L2 and outputs a detection signal Sd. The photodetector 41 may include a multi-anode type photomultiplier tube (PMT) having a plurality of anodes, a photodiode array in which a plurality of photodiodes are configured to be arranged in an array shape, or an avalanche photodiode array in which a plurality of avalanche photodiodes are arranged in an array shape. Alternatively, the photodetector 41 may be an area image sensor having a plurality of pixels such as a CCD image sensor, an EM-CCD image sensor, or a CMOS image sensor or may be a line sensor. In particular, the multi-anode type PMT has a high multiplication factor and has a larger light receiving surface than the others.

The filter 42 is arranged on the optical axis between the dichroic mirror 14 and the photodetector 41. The filter 42 cuts out wavelengths of the irradiation light L1 and wavelengths of fluorescence or the like unnecessary for observation from light incident on the photodetector 41. The converging lens 43 is arranged immediately in front of the photodetector 41 and converges the observation light L2 toward the photodetector 41. Also, the filter 42 may be arranged at either the front stage or the rear stage of the converging lens 43. Also, when the filter 42 is unnecessary, it is unnecessary to provide the filter 42.

The control unit 50 controls the irradiation light generating unit 10, the scanning unit 20, and the irradiation optical unit 30. For example, the control unit 50 controls the light source 11, the spatial light modulator 13, and the light scanner 21. Also, for example, the control unit 50 controls the position (height) of the objective lens 32 in the optical axis direction using the objective lens moving mechanism 33. Also, for example, the control unit 50 moves the stage 31 which supports the observation object B in a direction intersecting the optical axis direction. The control unit 50 is configured to include an input device 51 such as a mouse and a keyboard, a display device 52 such as a display, and a computer 53.

Also, the computer 53 is an example of an image creating unit according to this embodiment. The computer 53 is a personal computer, a smart device or the like and includes an image processing circuit (image processing processor), a control circuit (control processor), and an internal memory. The computer 53 creates an image of the observation object B using the detection signal Sd from the photodetector 41 and light irradiation position information in the light scanner 21. The created image is displayed on the display device 52. Also, the computer 53 is an example of a control unit (controller) in the present embodiment. The computer 53 controls a modulating pattern (hologram) to be presented on the spatial light modulator 13 so that a desired light converging point is formed in the observation object B. The computer 53 controls a modulation amount of intensity or phase for each of a plurality of pixels of the spatial light modulator 13 by controlling the modulating pattern to be presented on the spatial light modulator 13. The created image may be stored in the memory of the computer 53 or the external storage device.

Figure 2:
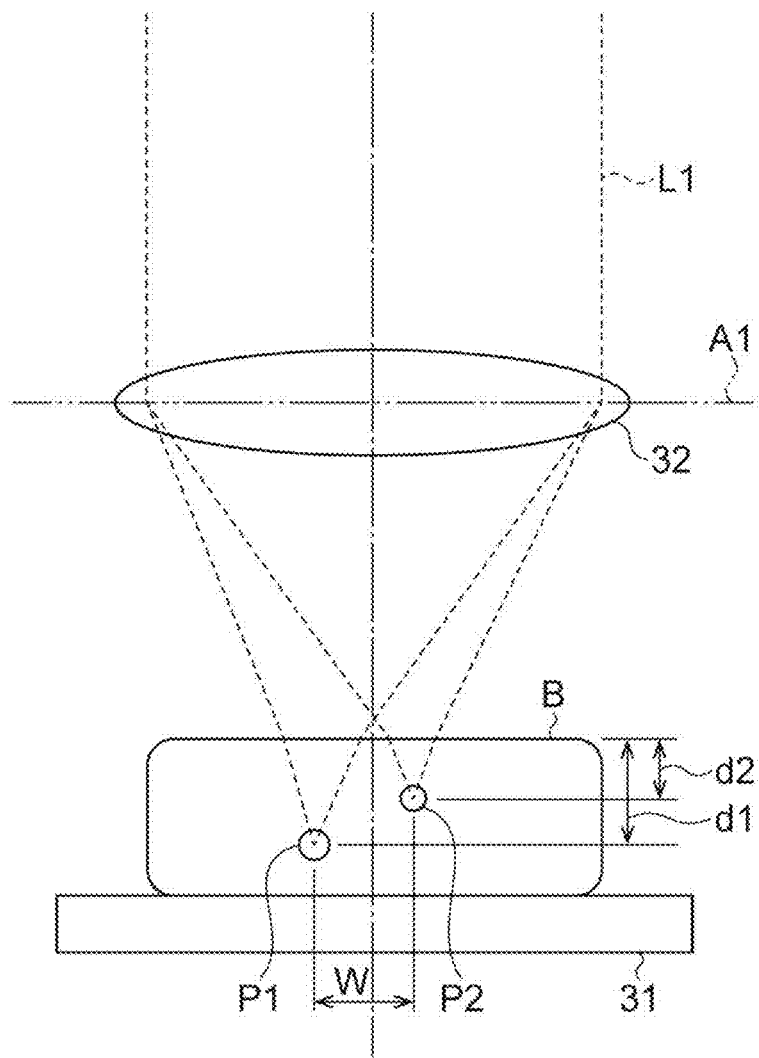
FIG. 2 is a diagram conceptually illustrating states of irradiation light on an observation object and its vicinity.

Here, the aspect of the light converging point of the observation object B will be described in detail. FIG. 2 is a diagram conceptually illustrating the states of the irradiation light L1 in the observation object B and its vicinity. As illustrated in FIG. 2, in the present embodiment, the irradiation light L1 is converged at a plurality of light converging points, i.e., a first light converging point P1 and a second light converging point P2, by the objective lens 32. Also, a virtual line A1 in FIG. 2 is a reference line representing a reference height of the objective lens 32.

The light converging points P1 and P2 have the following positional relationship. That is, the positions of the light converging points P1 and P2 in the optical axis direction of the objective lens 32 (in other words, the depth direction of the observation object B) are different from each other. This indicates that the depth d1 of the first light converging point P1 from a position at which the optical axis of the objective lens 32 intersects the surface of the observation object B is different from the depth d2 of the second light converging point P2.

Also, the positions of the light converging points P1 and P2 in a certain direction perpendicular to the optical axis direction of the objective lens 32 are different from each other. In other words, when viewed from the optical axis direction of the objective lens 32, the light converging points P1 and P2 do not overlap each other and have a predetermined spacing W.

Figure 3:
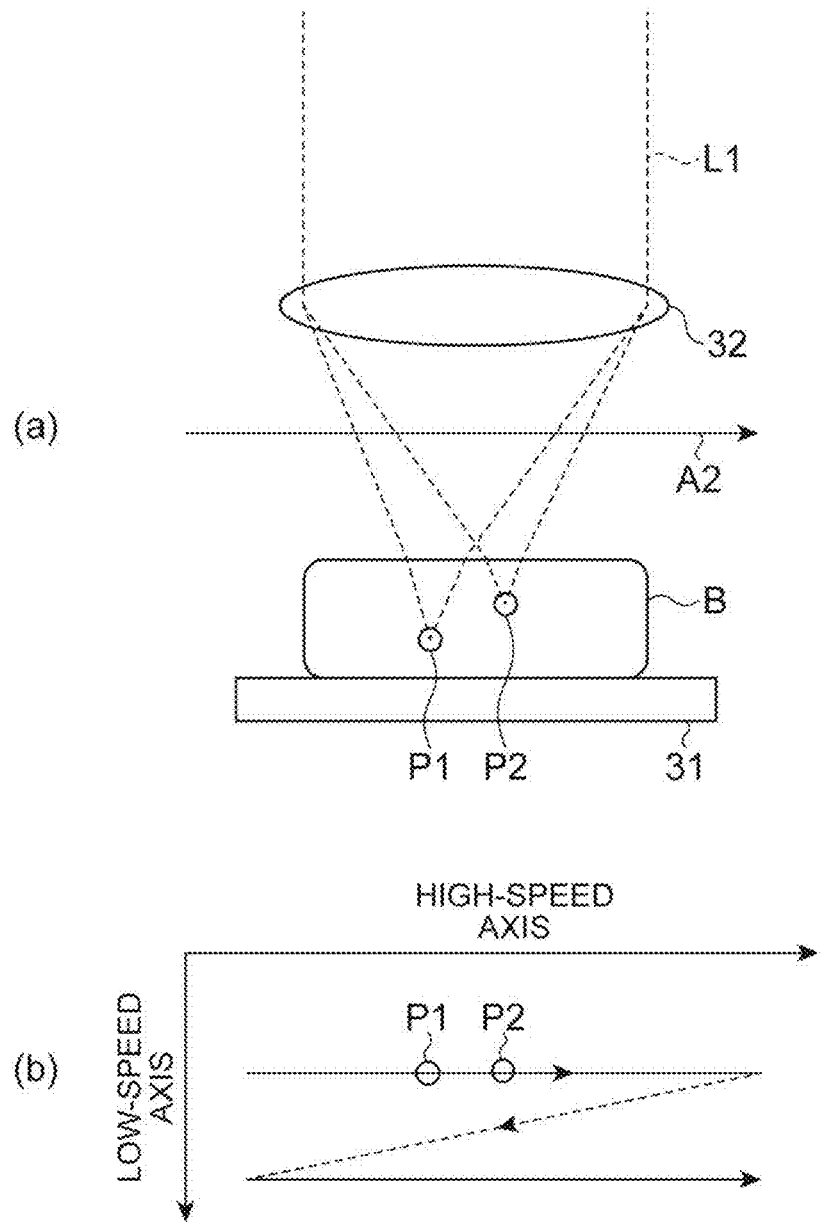
FIG. 3 is a diagram schematically illustrating an example of a direction in which light converging points are arranged when viewed from an optical axis direction of an objective lens.

FIG. 3 is a diagram schematically illustrating an example of the arrangement direction of the light converging points P1 and P2 viewed from the optical axis direction of the objective lens 32. FIG. 3(*a*) illustrates a scanning direction A2 of the light converging points P1 and P2 and FIG. 3(*b*) illustrates a state in which the light converging points P1 and P2 are scanned by the light scanner 21 viewed from the optical axis direction of the irradiation light L1. As illustrated in FIG. 3(*a*), in this example, when viewed from the optical axis direction of the irradiation light L1, the light converging points P1 and P2 are arranged in the scanning direction A2. Also, as illustrated in FIG. 3(*b*), there are a high-speed axis and a low-speed axis for scanning by the light scanner 21 and an operation in which the light converging points P1 and P2 move along the high-speed axis and then move again along the high-speed axis is iterated. In this example, the arrangement direction of the light converging points P1 and P2 viewed from the optical axis direction of the irradiation light L1 is along the high-speed axis (that is, the scanning direction). Also, the light scanner 21 may scan the light converging points P1 and P2 so that the light converging points P1 and P2 also move in the low-speed axis direction while moving along the high-speed axis. Also, not only line scanning but also tiling scanning may be used.

Figure 4:
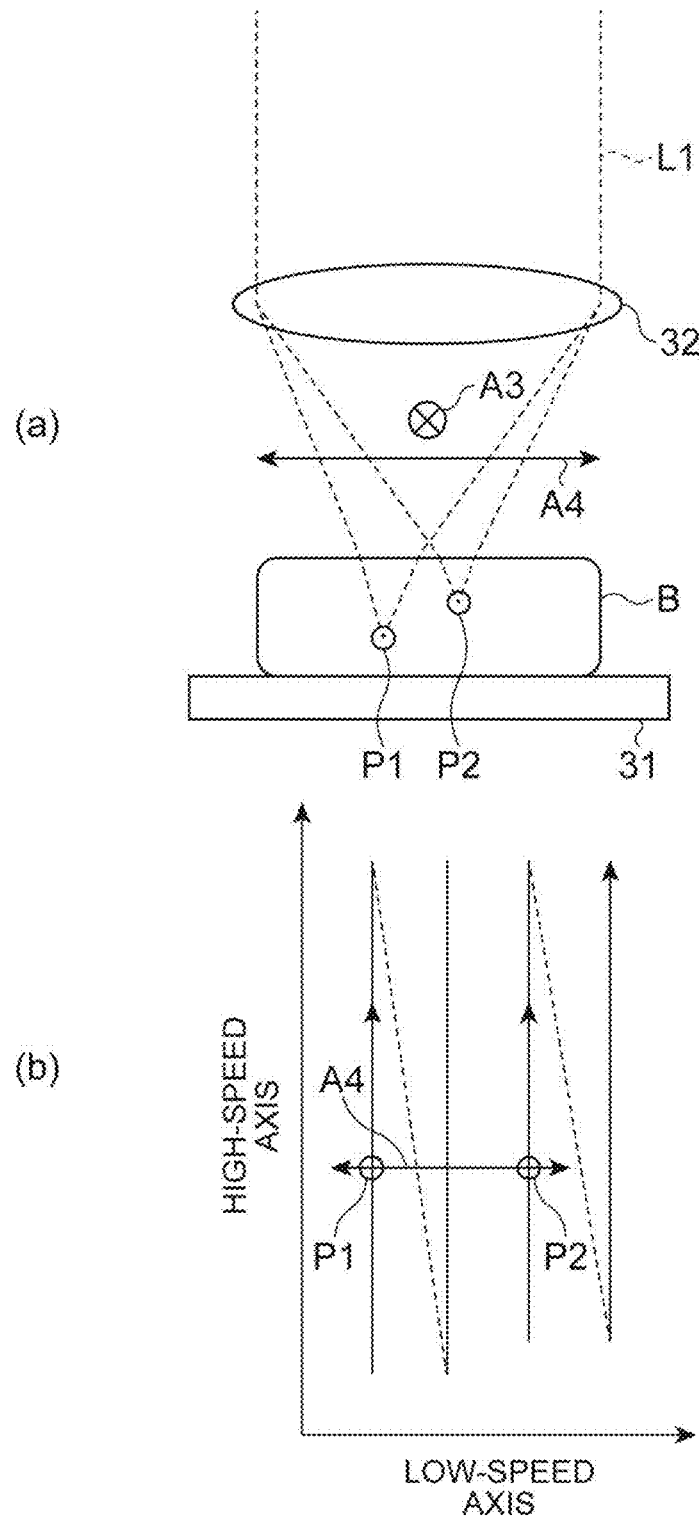
FIG. 4 is a diagram schematically illustrating another example of the arrangement direction of light converging points viewed from the optical axis direction of the objective lens.

Also, FIG. 4 is a diagram schematically illustrating another example of the arrangement direction of the light converging points P1 and P2 viewed from the optical axis direction of the objective lens 32. FIG. 4(a) illustrates a scanning direction A3 of the light converging points P1 and P2 and FIG. 4(b) illustrates the scanning of the light converging points P1 and P2 viewed from the optical axis direction of the irradiation light L1 by the light scanner 21. As illustrated in FIG. 4(a), in this example, when viewed from the optical axis direction of the irradiation light L1, the light converging points P1 and P2 are arranged along a direction A4 (first direction) intersecting the scanning direction A3. Also, as illustrated in FIG. 4(b), in this example, the arrangement direction A4 of the light converging points P1 and P2 when viewed from the optical axis direction of the irradiation light L1 is along the low-speed axis (that is, the axis intersecting the scanning direction). For example, a direction A4 is orthogonal to the scanning direction A3 or inclined with respect to the scanning direction A3.

The light converging points P1 and P2 formed with the positional relationship as described above are realized by the computer 53 for controlling the modulating pattern to be presented on the spatial light modulator 13 and the objective lens 32. The computer 53 controls the modulating pattern so that the light converging points P1 and P2 are formed on the observation object B. Thus, the light converging points P1 and P2 are formed by the objective lens 32 receiving the modulated irradiation light L1.

Figure 5:
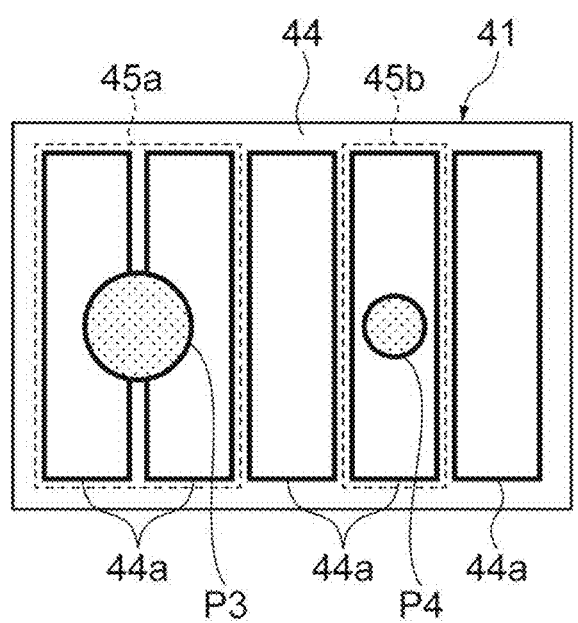
FIG. 5 is a front view illustrating a light detecting surface of a photodetector.

FIG. 5 is a front view illustrating a light detecting surface 44 of the photodetector 41 of the present embodiment. As illustrated in FIG. 5, a point image P3 of the observation light (first observation light) generated from the light converging point P1 and a point image P4 of the observation light (second observation light) generated from the light converging point P2 are formed on the light detecting surface 44. The photodetector 41 detects the first and second observation light by detecting the light intensity of each of the point images P3 and P4.

Also, when the depth of the light converging point of the observation object B is increased, a distance between the light converging point and the objective lens 32 becomes longer, so that a light diameter of the observation light reaching the photodetector 41 increases. In the present embodiment, because the light converging point P1 is formed at a position deeper than the light converging point P2, the point image P3 of the observation light from the light converging point P1 is illustrated to be larger than the point image P4 of the observation light from the light converging point P2 in FIG. 5.

Also, the photodetector 41 includes a plurality of light detecting units 44a. For example, when the photodetector 41 is a multi-anode PMT, the light detecting unit 44a corresponds to each anode of the multi-anode PMT. Also, for example, when the photodetector 41 is an area image sensor, the light detecting unit 44a corresponds to one pixel or pixel group. Also, for example, when the photodetector 41 is a photodiode array (line sensor), the light detecting unit 44a corresponds to each photodiode.

Also, the photodetector 41 has a first detection area 45a for detecting the point image P3 and a second detection area 45b for detecting the point image P4. The detection areas 45a and 45b are areas independent of each other and each of detection areas 45a and 45b is configured to include one or more light detecting units 44a. In the present embodiment, because the depths of the light converging points P1 and P2 are different from each other, the sizes of the point images P3 and P4 formed on the light detecting surface 44 which is a plane are also different from each other. That is, the deeper the depths d1 and d2 of the light converging points P1 and P2, the larger the point images P3 and P4. Also, when the image of the focal position of the objective lens 32 is configured to be formed on the light detecting surface 44, because distances between the focal position of the objective lens 32 and the light converging P1 and P2 in the optical axis direction of the objective lens 32 are different from each other, the sizes of the point images P3 and P4 formed on the light detecting surface 44 which is a plane are also different from each other. That is, as the distances between the focal position of the objective lens 32 and the light converging points P1 and P2 in the optical axis direction of the objective lens 32 increases, the point images P3 and P4 become larger. When the sizes of the point images P3 and P4 are larger than the size of the light detecting unit 44a, it is preferable to set the plurality of light detecting units 44a as detection areas.

Figure 6:
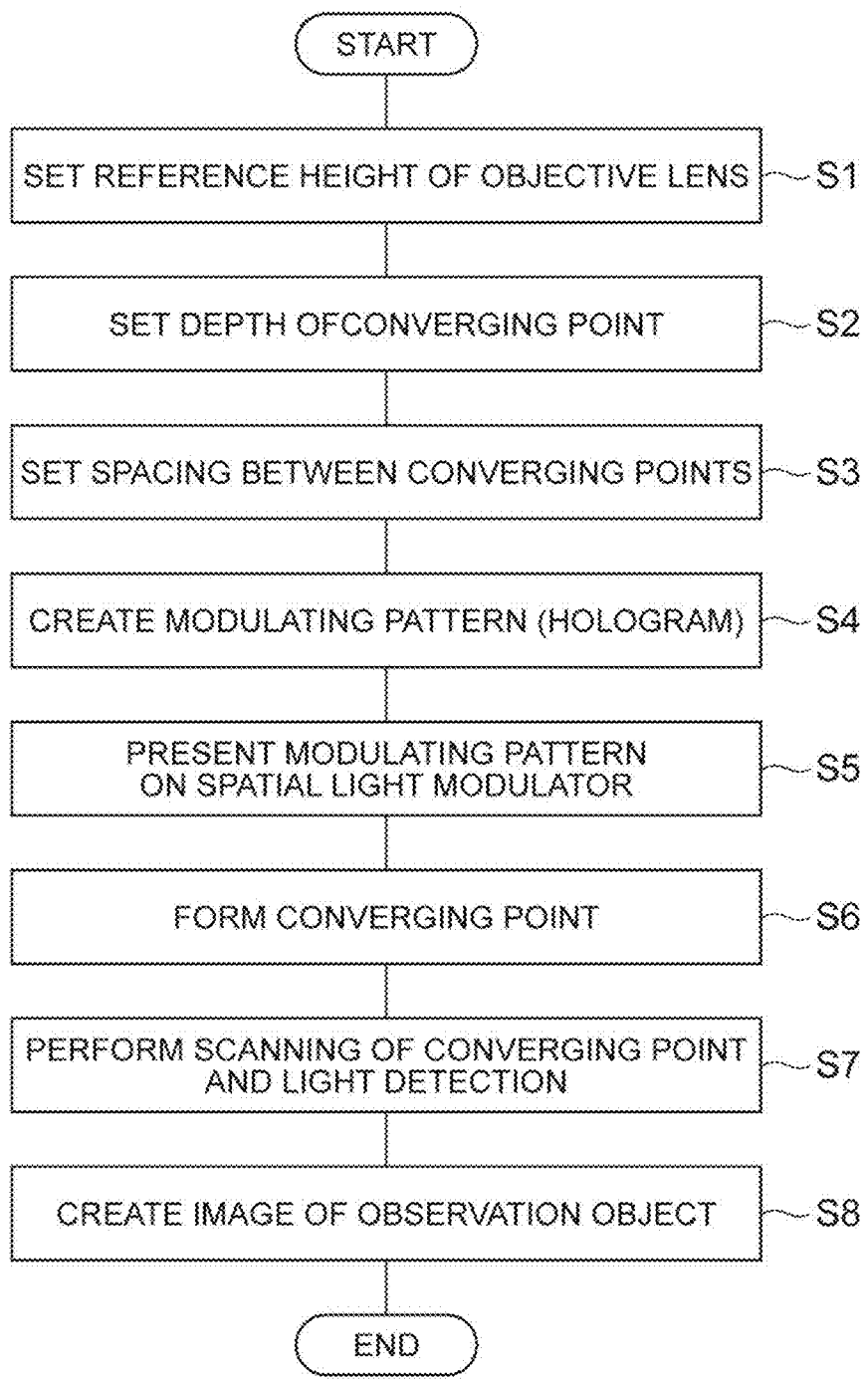
FIG. 6 is a flowchart illustrating an operation of the image acquisition device.

FIG. 6 is a flowchart illustrating the operation of the image acquisition device 1A described above. The image acquisition method according to the present embodiment will be described with reference to FIG. 6.

Figure 7:
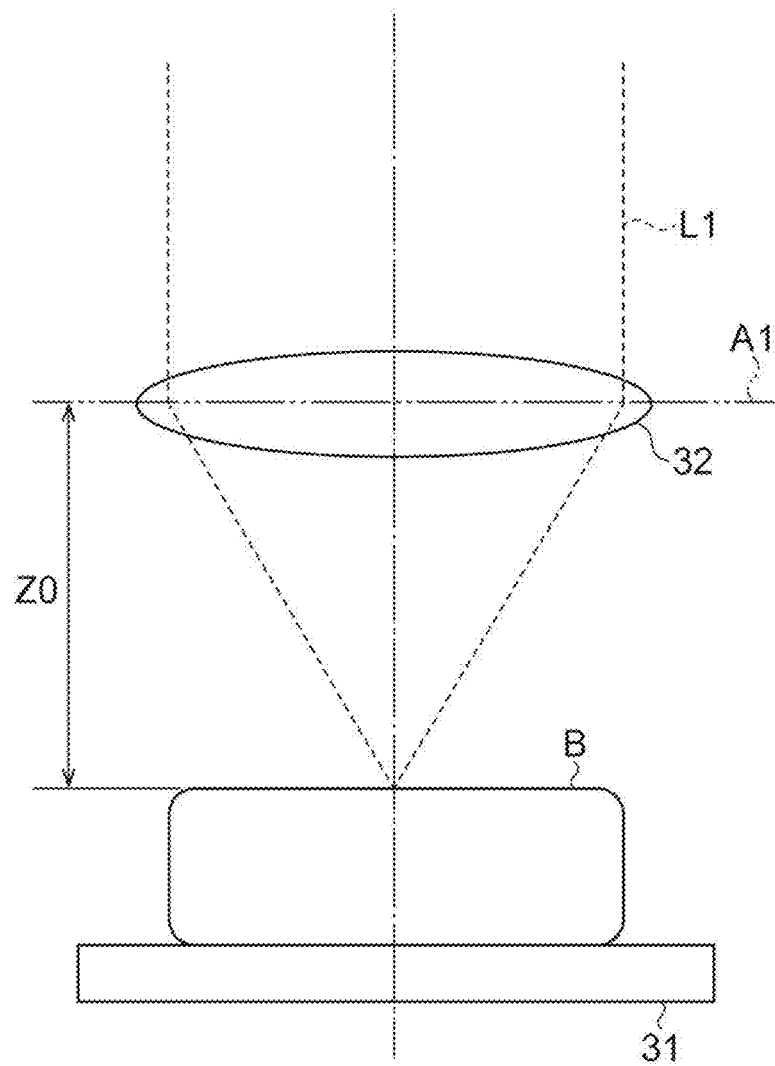
FIG. 7 is a diagram conceptually illustrating a state in which a reference height is set.

First, after the observation object B is placed on the stage 31, a reference height of the objective lens 32 is set (step S1). In step S1, a distance between the objective lens 32 and the observation object B is adjusted by the objective lens moving mechanism 33 or the stage 31 and the reference height is set. FIG. 7 is a diagram conceptually illustrating a state in which a reference height Z0 is set. For example, the height of the objective lens 32 may be adjusted so that the focal position of the objective lens 32 is aligned with the surface of the observation object B and a height thereof may be set as the reference height Z0. Also, by moving the stage 31 in the optical axis direction of the objective lens 32, the focal position of the objective lens 32 may be aligned with the surface of the observation object B. The computer 53 stores the reference height Z0.

Next, depths d1 and d2 of the light converging points P1 and P2 (that is, depths inside the observation object B from which the image is acquired) illustrated in FIG. 2 are set (step S2). In step S2, the observer sets the depths inside the observation object B (the depths d1 and d2 in FIG. 2) to be imaged through the input device 51. The depth inside the observation object B may be an actual distance or an optical distance. Also, in consideration of a refractive index of the medium (such as air, water, oil, glycerin, silicone, or the like) between the objective lens 32 and the observation object B and/or the refractive index of the observation object B, the depths d1 and d2 may be calculated. For example, when the movement amount (actual distance) in the optical axis direction of the stage 31 and/or the objective lens 32 is set as d, a refractive index of the medium between the objective lens 32 and the observation object B is set as $n_a$, and a refractive index of the observation object B is set as $n_b$, the computer 53 calculates the depths d1 and d2 in consideration of the actual optical distance of $n_b \cdot d/n_a$. Also, a movement amount(s) of the stage 31 and/or the objective lens 32 in the optical axis direction may be considered to be $n_a \cdot d/n_b$ using the optical distance as d.

Subsequently, the spacing W between the light converging points P1 and P2 illustrated in FIG. 2 is set (step S3). As described above, in the present embodiment, the irradiation light L1 modulated by the spatial light modulator 13 is converged by the objective lens 32, so that a plurality of light converging points P1 and P2 are formed inside the observation object B. If the spacing W between the plurality of light converging points P1 and P2 is narrow, the point images P3 and P4 overlap each other at the photodetector 41 and crosstalk occurs, so that it is desirable to set an appropriate spacing W at which the point images P3 and P4 do not overlap each other. In particular, as illustrated in FIG. 5, because the point images P3 and P4 become larger when the depths d1 and d2 of the light converging points P1 and P2 are deeper, it is preferable to further increase the spacing W when the depth of the light converging point is deeper in order to prevent crosstalk. Also, the spacing W may be set on the basis of parameters such as the numerical aperture (NA) of the objective lens 32, the refractive index of the medium between the objective lens 32 and the observation object B, the refractive index of the observation object B, and the wavelength of the irradiation light L1.

Subsequently, a modulating pattern (hologram) is created (step S4). In this step S4, a computer generated hologram (CGH) to be presented on the spatial light modulator 13 is created on the basis of the spacing W between the light converging points P1 and P2 and the depths d1 and d2 thereof set in the above-described steps S2 and S3. This step S4 is performed by, for example, the computer 53. Alternatively, CGHs corresponding to the depths d1 and d2 and the spacing W may be calculated in advance and stored as a table in a storage means inside the computer 53, and an appropriate CGH may be selected from among the CGHs.

Subsequently, the CGH created in step S4, i.e., a modulating pattern in which the light converging points P1 and P2 are formed in the observation object B, is presented on the spatial light modulator 13 (pattern presenting step S5). Then, the irradiation light L0 output from the light source 11 is modulated in the spatial light modulator 13, and the modulated irradiation light L1 is converged by the objective lens 32, so that the light converging points P1 and P2 are formed at the depths d1 and d2 in the observation object B (light converging point forming step S6). In steps S5 and S6, the distance between the objective lens 32 and the observation object B is adjusted so that the light converging points P1 and P2 are formed at the depths d1 and d2 inside the observation object B. In this state, the CGH is presented on the spatial light modulator 13, so that the irradiation light L0 output from the light source 11 is modulated, the modulated irradiation light L1 is converged by the objective lens 32, and the first light converging point P1 at the position of the depth d1 inside the observation object B and the second light converging point P2 at the position of the depth d2 are formed with the spacing W. Also, after the distance between the objective lens 32 and the observation object B is adjusted, the CGH may be presented on the spatial light modulator 13 and the modulated irradiation light L may be converged by the objective lens 32.

Subsequently, scanning and light detection of the light converging points P1 and P2 are performed (light detecting step S7). In this light detecting step S7, while the positions of the light converging points P1 and P2 inside the observation object B are scanned in the scanning direction intersecting the optical axis of the irradiation light L1, the observation light L2 generated from the light converging points P1 and P2 is detected. At this time, because the observation light L2 is de-scanned by the light scanner 21, it is possible to fixedly detect the positions of the point images P3 and P4 of the observation light L2 in the photodetector 41 while moving the light converging points P1 and P2. From the photodetector 41, detection signals Sd corresponding to the point images P3 and P4 are output to the computer 53.

Subsequently, an image of the observation object B is created (image creating step S8). In this image creating step S8, an image of the observation object B is created by the computer 53 using the detection signal Sd (light intensity information) obtained in the light detecting step S7 and the optical scanning position information (plane position information of the light converging points P1 and P2) from the light scanner 21. Also, this image creating step S8 may be performed in parallel with the above-described light detecting step S7.

In the image creating step S8, the characteristics of the acquired image differ according to an arrangement direction of the light converging points Pt and P2 with respect to the scanning direction. First, when the arrangement direction of the light converging points P1 and P2 is along the scanning direction (see FIG. 3), the light converging point P1 reaches a lower area of a trace where the light converging point P2 has moved with a time difference. In this case, because the lower area of an area observed according to the light converging point P2 is observed according to the light converging point P1, a surrounding influence due to the light converging point P2 can be ascertained from the image of the light converging point P1. Also, a three-dimensional composite image may be created by combining the image obtained by the light converging point P1 and the image obtained by the light converging point P2.

Also, when the arrangement direction of the light converging points P1 and P2 intersects the scanning direction (see FIG. 4), it is possible to acquire the image of the depth d1 by scanning the light converging point P1 and acquire the image of the depth d2 by scanning the light converging point P2 even when the objective lens 32 is not moved.

Effects of the image acquisition device 1A and the image acquisition method of the present embodiment described above will be described. In the image acquisition device 1A and the image acquisition method of the present embodiment, the modulating pattern is presented on the spatial light modulator 13, so that it is possible to simultaneously and easily form the light converging points P and P2 having different light converging positions in the optical axis direction of the irradiation light L1 (i.e., the depth direction of the observation object B). Then, the light converging points P1 and P2 are scanned, observation light L2 generated at the light converging points P1 and P2 forms the point images P3 and P4 in the photodetector 41 and light intensities of the point images P3 and P4 are detected by the photodetector 41. Because the photodetector 41 has a detection area 45a for detecting the light intensity of the observation light L2 in the point image P3 and a detection area 45b for detecting the light intensity of the observation light L2 in the point image P4, it is possible to simultaneously detect two observation lights L2 having different light emission positions. As described above, according to the image acquisition device 1A and the image acquisition method of the present embodiment, a plurality of irradiation lights L1 having mutually different light converging positions can be simultaneously radiated in the depth direction of the observation object B and a plurality observation lights L2 having mutually different emission positions in the depth direction can be further simultaneously detected. Accordingly, in a case in which the observation object B is thick or the like, it is possible to shorten the observation time and easily acquire states of a plurality of portions having different depths at the same time.

A specific example of shortening the observation time will be described. As an example of the light scanner, a light scanner using a resonance mirror can be included, but the scanning speed of the resonance mirror is about 10 kHz and the scanning time of the high-speed axis is 100 μsec. In a conventional microscope device, it is necessary to perform sweeping at a different depth in the optical axis direction by moving the objective lens or the stage in the optical axis direction after one sweeping operation is completed. Thus, a time period of at least 100 μsec or more is required to sweep areas of different depths. Also, another light scanner such as a light scanner using a galvanometer mirror also requires about the same time period because it is necessary to move the objective lens or the stage in the optical axis direction in order to sweep areas of different depths. Accordingly, in either case, it was difficult to simultaneously observe areas of different depths. On the other hand, according to the image acquisition device 1A of the present embodiment, a plurality of light converging points P1 and P2 having different positions in the optical axis direction can be generated along, for example, the high-speed axis, by the spatial light modulator 13, i.e., information about portions having different depths can be obtained with a small time difference. Accordingly, because the information about the portions having the different depths can be obtained at the same time, it is convenient to compare the portions having the different depths and the like.

Also, by forming a plurality of light converging points P1 and P2 using the modulating pattern presented on the spatial light modulator 13, it is possible to easily converging light at a desired position in a direction perpendicular or parallel to the optical axis direction of the irradiation light L1 and easily change the number of light converging points, a position, an intensity, and the like.

Also, as illustrated in FIG. 3, when viewed from the optical axis direction of the irradiation light L1, the light converging points P1 and P2 may be aligned along the scanning direction A2. Thereby, for example, it is possible to substantially simultaneously ascertain influences occurring at depths different from that of the light converging point P2 according to the light converging point P2 located at the front side in the scanning direction A2 by detecting the observation light L2 generated from the light converging point P1 located at the rear side in the scanning direction A2.

Also, as in the present embodiment, the photodetector 41 may include a multi-anode photomultiplier tube having a plurality of anodes or may include an area image sensor having a plurality of pixels. By either one thereof, the observation light L2 can be accurately detected in each of the point images P3 and P4.

Also, the image acquisition device of the present embodiment can be specifically used for a multiphoton excitation fluorescence microscope. The reason for this will be described below. Normally, a liquid crystal type spatial light modulator has polarization dependency. Because fluorescence is generally unpolarized, it is desirable to perform phase modulation in two polarization directions using two spatial light modulators so as to perform phase control using a liquid crystal type spatial light modulator. However, in general, the reflectance of a liquid crystal type spatial light modulator is about 90% and the reflectance is 81% when two spatial light modulators are used. Accordingly, weak fluorescence may be further weakened. On the other hand, when a deformable mirror is used instead of the spatial light modulator, the deformable mirror has no polarization dependence. However, a structure in which one mirror is pushed by a plurality of actuators from a rear surface is inferior in terms of phase expression capability and a structure in which a mirror and an actuator are arranged in a matrix form are inferior in terms of reflectance.

In the multiphoton excitation fluorescence microscope, fluorescence is generated particularly at a position where the photon density is high near the light converging point. If excitation light can be converged without the influence of aberration, the generated fluorescence is considered to be only fluorescence near the light converging point. Accordingly, if only the aberration of the excitation light is corrected and all the generated fluorescence is observed, the influence of the aberration on the fluorescence side can be substantially ignored. Therefore, because it is unnecessary to apply the spatial light modulator to the observation light, the above-described problem does not occur, and the spatial light modulator can be preferably used in the multi-photon excitation fluorescence microscope.

First Modified Example

Figure 8:
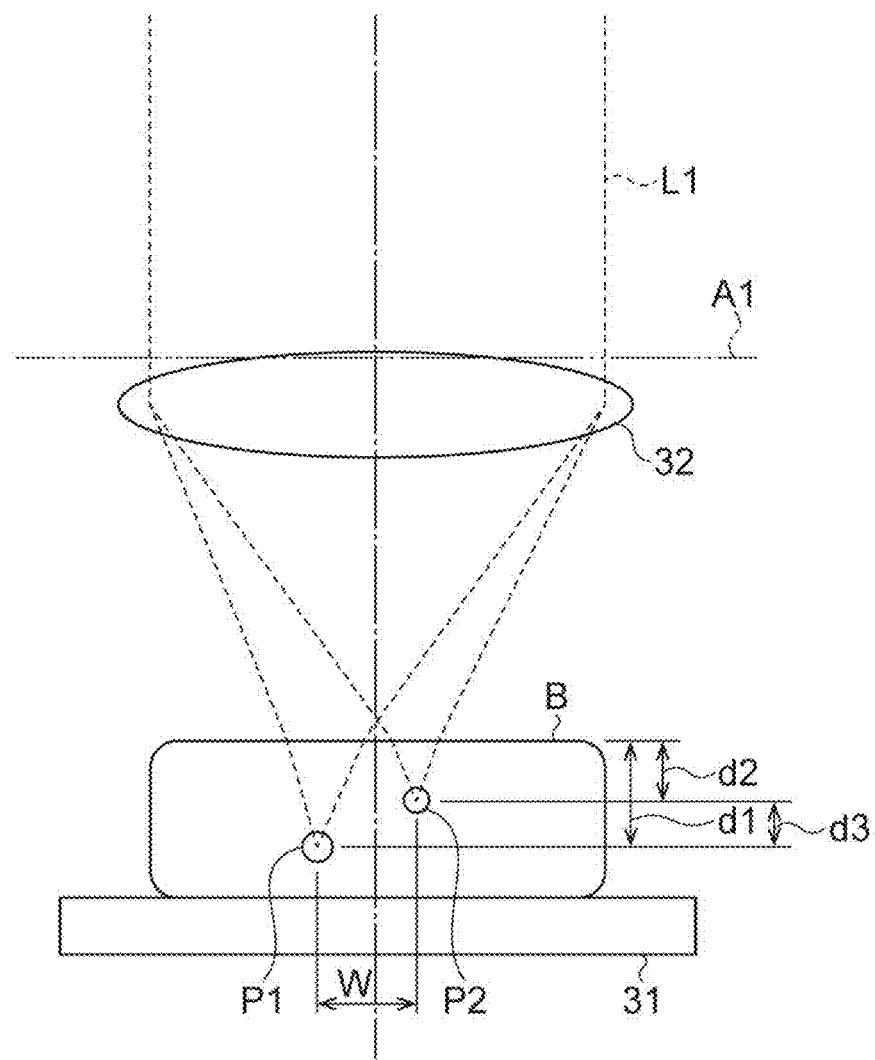
FIG. 8 is a diagram illustrating a first modified example and conceptually illustrates states of irradiation light on an observation object and its vicinity.

FIG. 8 is a view illustrating a first modified example of the above-described embodiment and conceptually illustrates the state of the irradiation light L1 in the observation object B and its vicinity. As illustrated in FIG. 8, in this modified example, one light converging point (for example, a light converging point P2) is formed at the focal position of the objective lens 32. Thus, a distance between the objective lens 32 and the observation object B is shorter than that in FIG. 2. In this case, by moving the objective lens 32 and/or the stage 31 in the optical axis direction of the objective lens 32, the distance between the objective lens 32 and the observation object B is adjusted so that a distance between the objective lens 32 and one light converging point is made to coincide with the focal length of the objective lens 32. Also, a virtual line A1 of FIG. 8 represents a reference height of the objective lens 32.

As in the present modified example, the depth d2 of the light converging point P2 may be realized by adjusting the distance between the objective lens 32 and the observation object B. In this case, it is only necessary for the spatial light modulator 13 to present a modulating pattern so that the light converging point P2 is simply formed at the focal length of the objective lens 32 and a modulating pattern for realizing the depth d2 of the light converging point P2 (in other words, for changing the distance between the light converging point P2 and the objective lens 32 from the focal length) is unnecessary. In this case, in order to realize the depth d1 of the light converging point P1, it is preferable for the computer 53 to calculate (or select) a modulating pattern for realizing the depth d1 of the light converging point P1 on the basis of a distance d3 between the light converging point P1 and the light converging point P2 in the optical axis direction of the irradiation light L1. Also, the user may directly input the position of the objective lens 32 with respect to the reference height Z0 to the computer 53.

Second Modified Example

In the above-described embodiment, the light converging points P1 and P2 are scanned by the light scanner 21. However, the light converging points P1 and P2 may be scanned by moving the stage 31 in a plane direction intersecting the optical axis direction. In other words, the scanning unit of the above-described embodiment may include the stage 31 in place of the light scanner 21 or together with the light scanner 21. Also in such a configuration, it is possible to preferably scan the light converging points P1 and P2.

Third Modified Example

In the above-described embodiment, the light converging points P1 and P2 are scanned by the light scanner 21. However, a pattern (light scanning hologram) for scanning the light converging points P1 and P2 may be included (superimposed) in the modulating pattern to be presented on the spatial light modulator 13. In this case, because the scanning unit in the above-described embodiment is unnecessary, it is possible to reduce the number of components of the image acquisition device 1A and contribute to size reduction.

Fourth Modified Example

Figure 9:
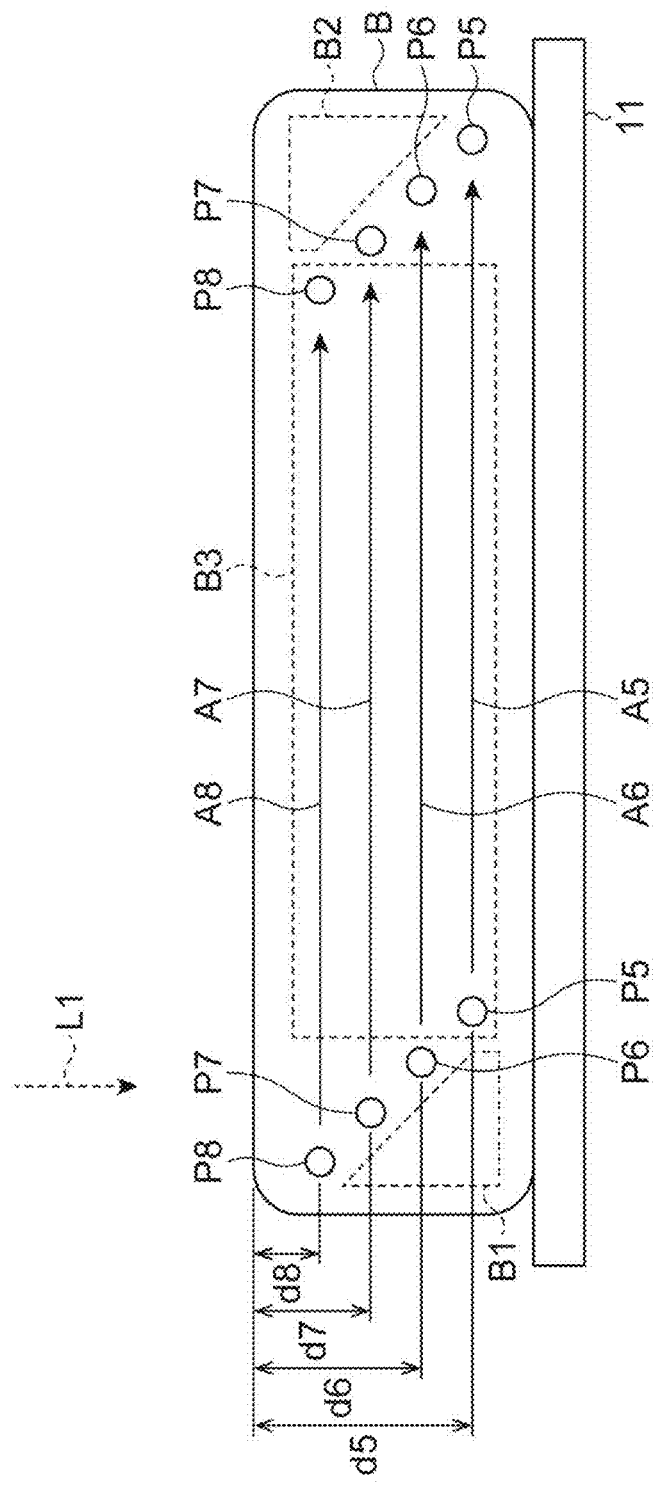
FIG. 9 is a diagram illustrating states of light converging points according to a fourth modified example.

Although the case in which the two light converging points P1 and P2 are formed inside the observation object B has been described in the above-described embodiment, three or more light converging points may be formed inside the observation object B. FIG. 9 is a diagram illustrating states of light converging points according to the fourth modified example of the above-described embodiment. As illustrated in FIG. 9, in this modified example, four light converging points P5 to P8 are formed inside the observation object B. Because positions of the light converging points P5 to P8 in the optical axis direction of the irradiation light L are different from one another, these depths d5 to d8 from the surface of the observation object B are different from one another. Also, when viewed from the optical axis direction of the irradiation light L1, these light converging points P5 to P8 are aligned in the scanning direction (arrows A5 to A8 in FIG. 9) at constant intervals.

Here, as illustrated in FIG. 9, when the light converging points P5 to P8 are arranged in the scanning direction when viewed from the optical axis direction of the irradiation light L1, areas (B1 and B2 in FIG. 9) through which the light converging point does not pass at both ends of the observation object B in the scanning direction are generated. Therefore, for example, it is preferable to create an image only in the area B3 through which all of the light converging points P5 to P8 pass. Specifically, for example, it is preferable to detect images with different depths by detecting the observation light from the light converging points P5 to P8 and clip an image of an area having the same scanning range from these images.

Figure 10:
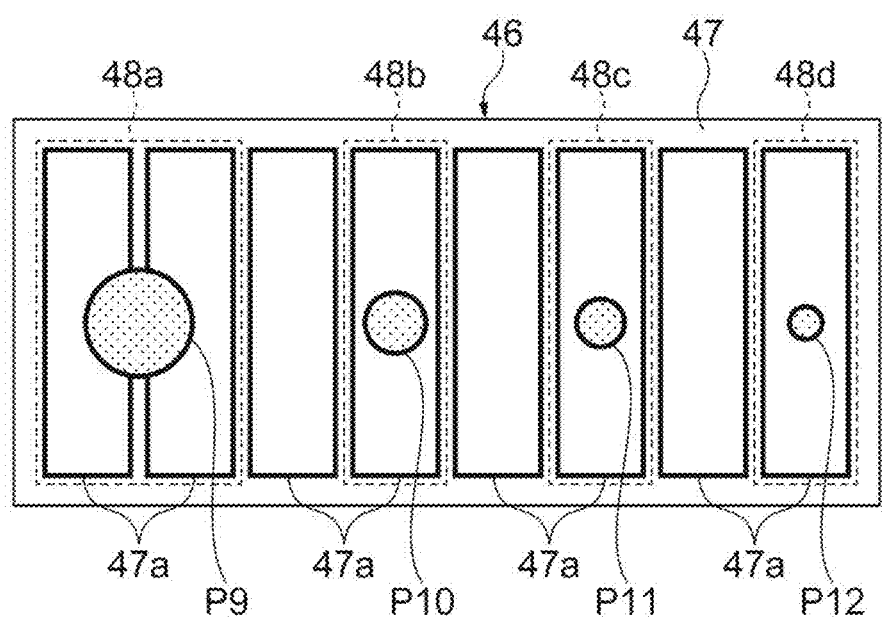
FIG. 10 is a front view illustrating a light detecting surface of a photodetector in a fourth modified example.

Also, FIG. 10 is a front view illustrating the light detecting surface 47 of the photodetector 46 in the present modified example. As illustrated in FIG. 10, point images P9 to P12 are formed on the light detecting surface 47 by the observation light generated from the light converging points P5 to P8. The photodetector 46 detects a plurality of observation lights by detecting light intensities of the point images P9 to P12. Also, as the depth of the light converging point in the observation object B increases, the distance between the light converging point and the objective lens 32 increases, so that the light diameter of the observation light reaching the photodetector 46 increases. Because the light converging points P5 to P8 are sequentially formed at deeper positions in the present embodiment, the point image P9 of the observation light from the light converging point P5 is the largest and the point image P12 of the observation light from the light converging point P8 is the smallest in FIG. 10.

Also, the photodetector 46 includes a plurality of photodetectors 47a and has detection areas 48a to 48d for detecting the point images P9 to P12, respectively. The detection areas 48a to 48d are independent from one another and each of the detection areas 48a to 48d is configured to include one or more light detecting units 47a.

Figure 11:
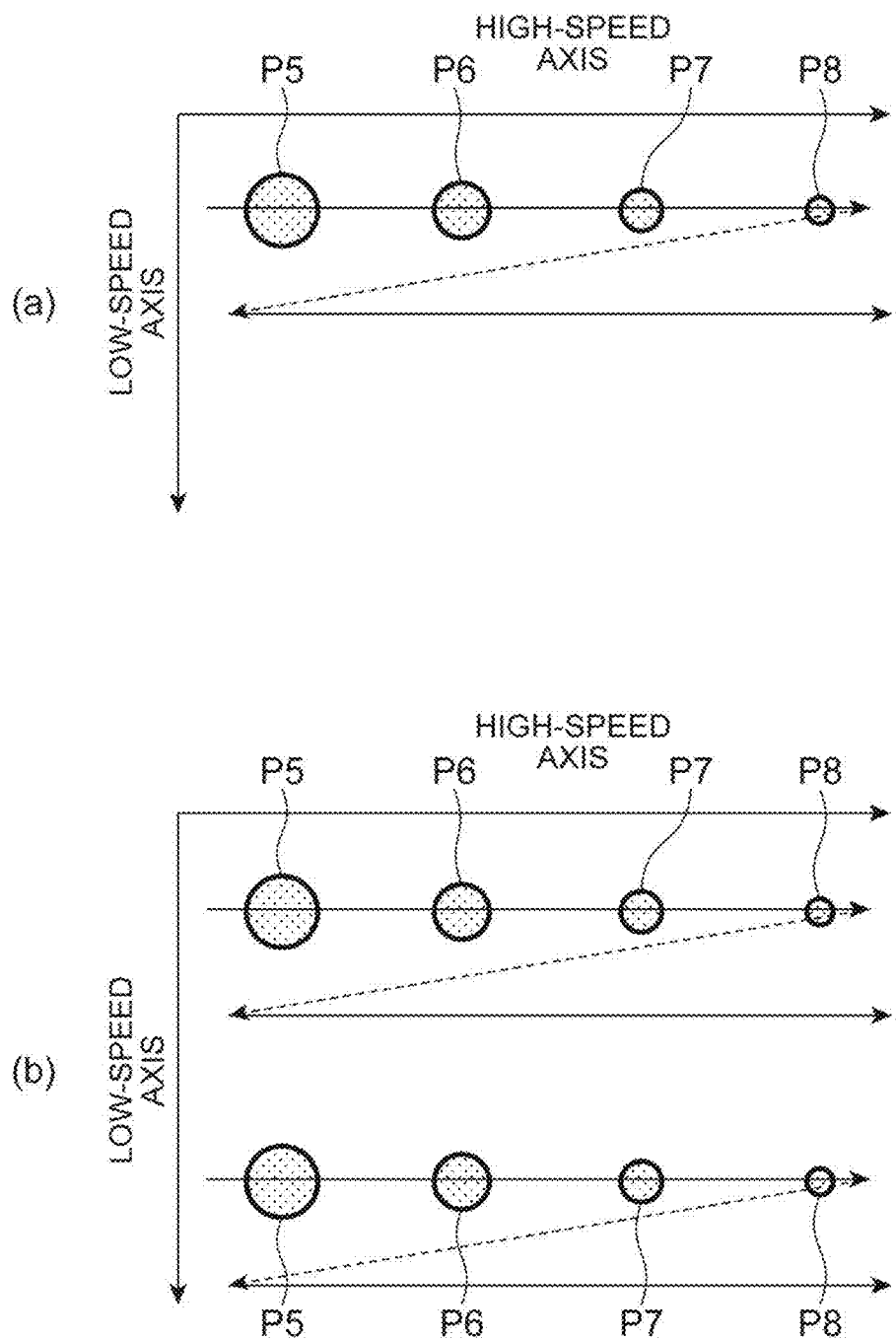
FIG. 11 is a diagram conceptually illustrating a state of scanning of a light converging point viewed from the optical axis direction of irradiation light.
Figure 12:
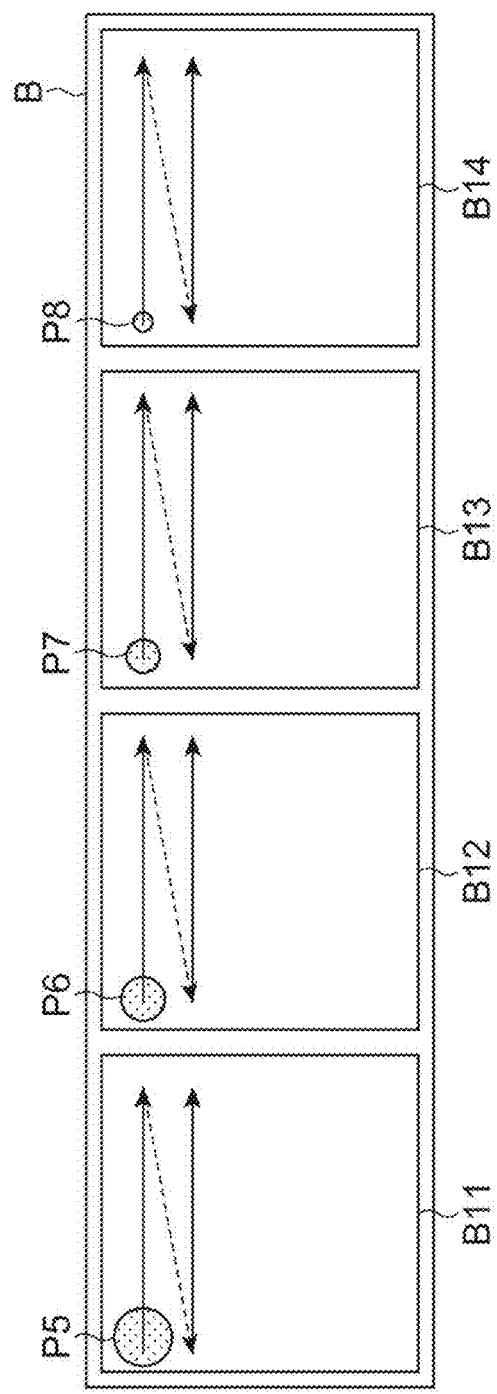
FIG. 12 is a diagram conceptually illustrating a state of scanning of a light converging point viewed from the optical axis direction of irradiation light.

Here, the scanning mode of the light converging points P5 to P8 in the present modified example will be described. FIGS. 11 and 12 are diagrams conceptually illustrating the state of scanning of the light converging points P5 to P8 when viewed from the optical axis direction of the irradiation light L1. For example, as illustrated in FIG. 11(a), the light converging points P5 to P8 may be arranged in one column along the high-speed axis. Also, as illustrated in FIG. 11(b), the light converging points P5 to P8 form a plurality of groups, an observation object B is divided into a plurality of areas, and each area may be scanned by a group of light converging points P5 to P8. Also, for example, as illustrated in FIG. 12, the observation object B may be divided into a plurality of areas B11 to B14 and each area may be scanned by one light converging point P5, P6, P7, or P8.

According to the present modified example, as in the above-described embodiment, it is possible to simultaneously radiate a plurality of irradiation lights L1 having different light converging positions in the depth direction of the observation object B and further simultaneously detect a plurality of observation lights L2 having different light emission positions in the depth direction. Accordingly, it is possible to shorten an observation time in a case in which the observation object is thick or the like and easily acquire states of a plurality of portions having different depths at the same time.

Although a case in which four light converging points P5 to P8 are formed is exemplified in the present modified example, the number of light converging points can be easily changed by controlling the modulating pattern to be presented on the spatial light modulator. In that case, an irradiation light intensity per light converging point is represented by $(E/N) \times \eta$ where E is the total light quantity of the irradiation light L1, N is the number of light converging points, and $\eta$ is the efficiency of the spatial light modulator. The efficiency $\eta$ of the spatial light modulator is a product of an efficiency of light utilization (a proportion of an amount of light used for phase modulation out of an amount of incident light) and a diffraction efficiency (a proportion of an amount of light capable of being diffracted to a desired position, which is determined according to a spatial frequency of the hologram presented on the spatial light modulator). Accordingly, when the number of light converging points N is changed, an irradiation light intensity per light converging point also changes. Because the observation light intensity also changes when the irradiation light intensity at each light converging point changes, block noise may occur in a reconfigured image. In order to avoid such a problem, for example, it is preferable to provide an optical system and a measurement system for measuring an intensity change and an intensity variation in each point image of the observation light L2 and provide feedback to a light output intensity of the light source 11.

Alternatively, it is preferable to predict the intensity change in advance according to the number of light converging points N and change a light output intensity of the light source 11 when the number of light converging points N is changed.

Example

Here, an example of the above-described embodiment will be described. In the present example, a resin containing a plurality of fluorescent beads each having a diameter of 3 µm and fluorescent beads each having a diameter of 10 µm was prepared as the observation object B. This resin was observed using an objective lens (having 40× water immersion and NA of 1.15). Light converging points P5 to P8 were formed at positions of depths d5 to d8 and images were obtained by scanning the light converging points P5 to P8. At this time, the plurality of light converging points P5 to P8 was arranged in a direction orthogonal to the scanning direction. Also, as the optical distances for the depths d5 to d8, d5=15.0 µm, d6=11.25 µm, d7=7.5 µm, and d8=3.75 µm.

Figure 13:
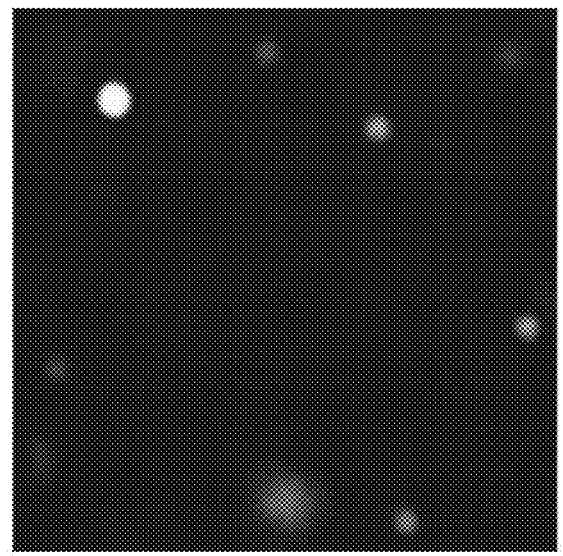
FIG. 13 illustrates an image obtained by clipping only a common area among scanning areas of light converging points.
Figure 13:
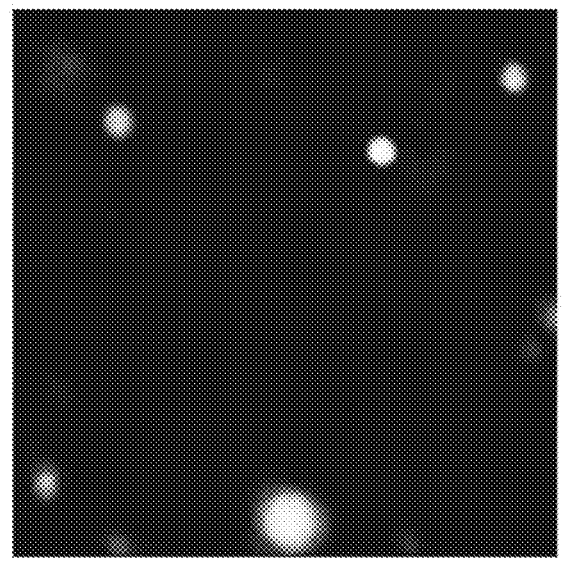
Figure 14:
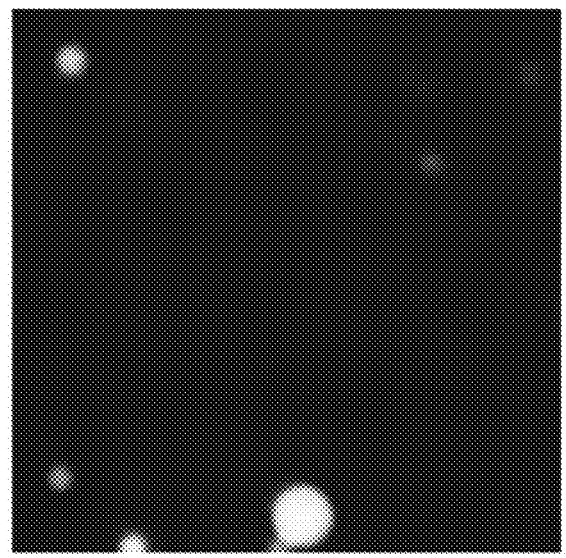
FIG. 14 illustrates an image obtained by clipping only a common area among scanning areas of light converging points.
Figure 14:
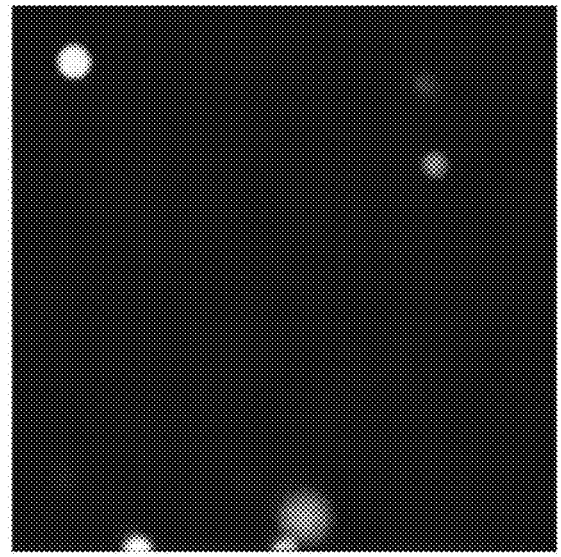

FIGS. 13 and 14 illustrate images obtained by clipping only the common area (area B3 in FIG. 9) among the scanning areas of the light converging points P5 to P8. FIG. 13(a) illustrates an image obtained from the light converging point P8, FIG. 13(b) illustrates an image obtained from the light converging point P7, FIG. 14(a) illustrates an image obtained from the light converging point P6, and FIG. 14(b) illustrates an image obtained from the light converging point P5. In these images, it can be seen that fluorescent beads of 10 µm are present in the vicinity of the lower center, but these fluorescent beads can be observed at any depth. Also, because there are no fluorescent beads with a diameter of 3 µm that exist across three images of these four images, resolution in the depth direction is considered to be able to be sufficiently secured.

INDUSTRIAL APPLICABILITY

It is possible to simultaneously radiate a plurality of lights having different light converging positions in a depth direction of an observation object.

| Reference Signs List | |
|---|---|
| 1A | Image acquisition device |
| 10 | Irradiation light generating unit |
| 11 | Light source |
| 12 | Beam expander |
| 13 | Spatial light modulator |
| 14 | Dichroic mirror |
| 20 | Scanning unit |
| 21 | Light scanner |
| 22 | Mirror |
| 30 | Light radiating optical unit |
| 31 | Stage |
| 32 | Objective lens |
| 33 | Objective lens moving mechanism |
| 34 | Reflection mirror |
| 40 | Observation unit |
| 41 | Photodetector |
| 42 | Filter |
| 43 | Condenser lens |
| 44 | Light detecting surface |
| 44a | Light detecting unit |
| 45a | First detection area |
| 45b | Second detection area |
| 50 | Control unit |
| 51 | Input device |
| 52 | Display device |
| 53 | Computer |
| 61, 62 | Telecentric optical system |
| B | Observation object |
| L0 | Irradiation light |
| L1 | Irradiation light |
| L2 | Observation light |
| P1 | First light converging point |
| P2 | Second light converging point |
| P3, P4 | Point image |
| P5 to P8 | Light converging point |
| P9 to P12 | Point image |

The invention claimed is:

1. An image acquisition device comprising:
a spatial light modulator configured to modulate irradiation light output from a light source;
a controller configured to control a modulating pattern to be presented on the spatial light modulator so that a first light converging point and a second light converging point are formed in an observation object;
a lens configured to converge the modulated irradiation light to form the first light converging point and the second light converging point in the observation object;
a scanner configured to scan positions of the first light converging point and the second light converging point in the observation object in a scanning direction intersecting an optical axis of the lens; and
a photodetector configured to detect first observation light generated from the first light converging point and second observation light generated from the second light converging point,
wherein the photodetector has a first detection area for detecting the first observation light and a second detection area for detecting the second observation light, and
wherein the positions of the first light converging point and the second light converging point are at different distances in a direction that extends along the optical axis.

2. The image acquisition device according to claim 1, wherein the first light converging point and the second light converging point are arranged in the scanning direction when viewed from the direction of the optical axis.

3. The image acquisition device according to claim 1, wherein the first light converging point and the second light converging point are arranged in a first direction intersecting the scanning direction when viewed from the direction of the optical axis.

4. The image acquisition device according to claim 3, wherein the first direction is perpendicular to the scanning direction.

5. The image acquisition device according to claim 3, wherein the first direction is inclined with respect to the scanning direction.

6. The image acquisition device according to claim 1, wherein the scanner includes a light scanner configured to receive the modulated irradiation light.

7. The image acquisition device according to claim 1, wherein the scanner includes a stage configured to move the observation object in the scanning direction while holding the observation object.

8. The image acquisition device according to claim 1, wherein the photodetector includes a multi-anode photomultiplier tube having a plurality of anodes.

9. The image acquisition device according to claim 1, wherein the photodetector includes an area image sensor having a plurality of pixels.

10. The image acquisition device according to claim 1, wherein the photodetector includes an avalanche photodiode array having a plurality of avalanche photodiodes.

11. An image acquisition device comprising:
a spatial light modulator configured to modulate irradiation light output from a light source;
a controller configured to control a modulating pattern to be presented on the spatial light modulator so that a first light converging point and a second light converging point are formed in an observation object;
a lens configured to converge the modulated irradiation light to form the first light converging point and the second light converging point in the observation object; and a photodetector configured to detect first observation light generated from the first light converging point and second observation light generated from the second light converging point, wherein the modulating pattern includes a pattern for scanning the first light converging point and the second light converging point in a scanning direction intersecting an optical axis of the lens, wherein the photodetector has a first detection area for detecting the first observation light and a second detection area for detecting the second observation light, and wherein the positions of the first light converging point and the second light converging point are at different distances in a direction that extends along the optical axis.

12. An image acquisition method comprising:
by a spatial light modulator, modulating irradiation light output from a light source based on a modulating pattern for forming a first light converging point and a second light converging point in an observation object;
converging the modulated irradiation light by a lens to form the first light converging point and the second light converging point in the observation object;
scanning positions of the first light converging point and the second light converging point in the observation object in a scanning direction intersecting an optical axis of the lens;
detecting first observation light generated from the first light converging point and second observation light generated from the second light converging point during the scanning and generating a detection signal; and
creating an image of the observation object based on the detection signal,
wherein the photodetector includes a first detection area for detecting the first observation light and a second detection area for detecting the second observation light, and
wherein the positions of the first light converging point and the second light converging point are at different distances in a direction that extends along the optical axis.

13. The image acquisition method according to claim 12, wherein the first light converging point and the second light converging point are arranged in the scanning direction when viewed from the direction of the optical axis.

14. The image acquisition method according to claim 12, wherein the first light converging point and the second light converging point are arranged in a first direction intersecting the scanning direction when viewed from the direction of the optical axis.

15. The image acquisition method according to claim 14, wherein the first direction is perpendicular to the scanning direction.

16. The image acquisition method according to claim 14, wherein the first direction is inclined with respect to the scanning direction.

17. The image acquisition method according to claim 12, wherein the scanning is performed using a light scanner receiving the modulated irradiation light in the detecting.

18. The image acquisition method according to claim 12, wherein the scanning is performed using a stage moving the observation object in the scanning direction while holding the observation object in the detecting.

19. The image acquisition method according to claim 12, wherein the scanning is performed using the spatial light modulator by modulating the irradiation light based on a pattern for scanning the first light converging point and the second light converging point is superimposed on the modulating pattern in the detecting.

20. The image acquisition method according to claim 12, wherein the photodetector includes a multi-anode photomultiplier tube having a plurality of anodes.

21. The image acquisition method according to claim 12, wherein the photodetector includes an area image sensor having a plurality of pixels.

22. The image acquisition method according to claim 12, wherein the photodetector includes an avalanche photodiode array having a plurality of avalanche photodiodes.

* * * * *